(12) United States Patent
Mansfield et al.

(10) Patent No.: US 12,358,471 B2
(45) Date of Patent: Jul. 15, 2025

(54) SEMI-TRAILER AND INTERMODAL CHASSIS DE-ICING SYSTEMS

(71) Applicants: Theodore David Mansfield, Charleston, WV (US); Laurence Jay Levine, Henderson, NV (US); Blake Naccarato, Las Vegas, NV (US)

(72) Inventors: Theodore David Mansfield, Charleston, WV (US); Laurence Jay Levine, Henderson, NV (US); Blake Naccarato, Las Vegas, NV (US)

( * ) Notice: Subject to any disclaimer, the term of this patent is extended or adjusted under 35 U.S.C. 154(b) by 0 days.

(21) Appl. No.: 18/798,790

(22) Filed: Aug. 8, 2024

(65) Prior Publication Data

US 2025/0083646 A1 Mar. 13, 2025

Related U.S. Application Data

(63) Continuation-in-part of application No. 17/670,515, filed on Feb. 14, 2022, now Pat. No. 12,177,944.

(51) Int. Cl.
| | |
|---|---|
| *B60S 1/66* | (2006.01) |
| *G05D 23/20* | (2006.01) |
| *H05B 1/02* | (2006.01) |

(52) U.S. Cl.
CPC ............... *B60S 1/66* (2013.01); *G05D 23/20* (2013.01); *H05B 1/0236* (2013.01); *H05B 2214/02* (2013.01)

(58) Field of Classification Search
CPC ........ H05B 1/0238; H05B 3/342; H05B 3/56; H05B 2203/015; H05B 2203/011; H05B 3/34; H05B 2203/014; H05B 2203/005; H05B 2214/04; H05B 2203/017; H05B 2203/003; H05B 2203/029; H05B 1/0236; H05B 3/36; H05B 2203/007; H05B 2203/013; H05B 2214/02; B60R 16/03
USPC ....... 219/202, 209, 217, 212, 211, 494, 528, 219/553, 552, 541, 538, 529
See application file for complete search history.

(56) References Cited

U.S. PATENT DOCUMENTS

| | | |
|---|---|---|
| 4,499,365 A | 2/1985 | Abe |
| 4,967,057 A | 10/1990 | Bayless et al. |
| 5,854,470 A | 12/1998 | Silva |
| 6,051,812 A | 4/2000 | Walker |

(Continued)

FOREIGN PATENT DOCUMENTS

CN 106394607 A 2/2017

*Primary Examiner* — Phuong T Nguyen
(74) *Attorney, Agent, or Firm* — The Thornton Firm, LLC

(57) ABSTRACT

A system for ice removal and prevention of ice accumulation on semi-trailers and intermodal shipping container chassis systems includes a power supply, a semi-trailer having at least one surface; a plurality of heating elements mounted and spaced apart at regular intervals from one another on at least one surface of the semi-trailer, at least one temperature sensor, a temperature controller having at least one processor and memory having computer executable instructions which cause the system to allow a user to program a desired temperature of a surface of a semi-trailer; sense a temperature of a surface of the semi-trailer; heat the semi-trailer surface with the plurality of heating elements; and maintain a desired temperature of the a surface of the semi-trailer. The system may further include a plurality of heating elements attached to the frames of twist-locks for intermodal chassis systems.

9 Claims, 15 Drawing Sheets

(56) References Cited

U.S. PATENT DOCUMENTS

| | | | |
|---|---|---|---|
| 6,278,085 B1 * | 8/2001 | Abukasm | H05B 3/36 |
| | | | 219/544 |
| 6,946,621 B1 | 9/2005 | Roseman | |
| 7,783,400 B1 | 8/2010 | Zimler | |
| 8,276,972 B2 | 10/2012 | Domo et al. | |
| 9,290,890 B2 | 3/2016 | Naylor et al. | |
| 9,475,466 B2 | 10/2016 | Kowalk | |
| 10,759,393 B2 | 9/2020 | Carroll | |

\* cited by examiner

SEMI-TRAILER AND INTERMODAL CHASSIS DE-ICING SYSTEMS

CROSS-REFERENCE TO RELATED APPLICATIONS

The present Continuation-In-Part application claims priority benefit of the U.S. nonprovisional application for patent Ser. No. 17/670,515 titled "Flatbed Trailer De-Icing Systems," filed on Feb. 14, 2022 under 35 U.S.C. 119 (e). The contents of this related nonprovisional application are incorporated herein by reference for all purposes to the extent that such subject matter is not inconsistent herewith or limiting hereof.

RELATED CO-PENDING U.S. PATENT APPLICATIONS

The present utility patent application is a Continuation-In-Part application for patent Ser. No. 17/670,515 titled "Flatbed Trailer De-Icing Systems," filed on Feb. 14, 2022 which is currently co-pending with this present application.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

BACKGROUND OF THE INVENTION

1. Field of the Invention

The invention relates generally to the field of de-icing systems. More specifically, the present invention relates to a system for ice removal from, and the prevention of ice buildup on, semi-trailers, and the twist-locks used by intermodal shipping container chassis systems.

2. Description of the Related Art

Many workers in the transportation industry have been faced with the dangerous situation of loading and unloading cargo in freezing and icy conditions. Ice and snow accumulate on the roof and deck of semi-trailers and serves as a hazard to passing motorists as it falls off. Such falling snow and ice causes millions of dollars in property damage every year. In addition to property damage, such conditions have resulted in serious injuries and death to laborers and passing motorists alike.

According to the Department of Transportation (DOT), in 2019 September through May, falling objects from flatbed semi-trailers resulted in over 5,000 fatalities and almost 80,000 serious injuries. A significant number of those deaths and injuries were the result of snowy and icy conditions. The cost of medical care, worker's compensation payments, and disability payments is huge, with significant costs to the insurance and transportation industries.

Various states have tried to enact laws and place fines on commercial drivers who fail to clean off the roof or deck of their semi-trailer, but such standards have been difficult to enforce. Occupational Safety and Health Administration (OSHA) safety laws forbid commercial drivers from climbing up on the 13.6" foot high roof, which can result in death and/or disability to the driver as these structures are not manufactured to support the weight of an individual.

For many truckers, snow and ice accumulation causes another problem: Shipping container chassis systems which utilize twist-locks to secure containers to a semi-trailer container chassis become coated in ice, the removal of which can take several hours and put workers in danger. In many locations, no facilities or additional personnel are available to assist in the removal of such ice.

Currently, there is no remedy to prevent or melt ice and/or snow on a semi-trailer. Nor does there exist any system designed to prevent or melt ice on twist-locks of intermodal shipping container chassis systems.

Improvements regarding the issue that are known in the prior art are provided below:

Patent with publication number U.S. Pat. No. 9,475,466 is related to "Navigation-linked vehicle de-icer or debris-remover control." The device of the invention comprises a vehicle navigation unit in communication with a snow removal element. The systems and methods of the present disclosure can have the benefit of removing snow or ice from a vehicle exterior surface before the vehicle arrives at a destination such as a storage garage, thereby minimizing the deposition of snow or ice at the destination.

Patent with publication number U.S. Pat. No. 9,290,890 is related to "Heating unit for direct current applications." The heating unit includes a first pliable outer layer and a second pliable outer layer. The heating unit further includes a pliable electrical heating element disposed between the first and the second cover layers and configured to convert electrical energy to heat energy and to distribute the heat energy.

Patent with publication number CN 106394607 is related to "A kind of EMU car load bogie de-icer". The invention discloses a kind of EMU cars to carry bogie de-icer, and solves the situation of EMU snow melt clearing ice technology, strong applicability, at low cost and de-icing effect are good with heating power de-icing method design de-icer without changing the structure of existing motor train unit bogie and underbody.

Patent with publication number U.S. Pat. No. 10,759,393 is related to "Snow and ice removal device". The device of the invention may include one or more, heating elements. A control unit may be configured to control the heating element to produce heat. A power source may be in electrical communication with the control unit and the heating element. Heat may be applied to the roof surface by the heating element to loosen and/or melt accumulated ice or snow from the roof surface of the vehicle.

Patent with publication number U.S. Pat. No. 7,783,400 is related to "Smart car ice and snow eliminator". The system allows consumers to remotely activate the ice and snow elimination system in Standard Sentry Mode to keep the exterior car surfaces free of ice and snow.

Patent with publication number U.S. Pat. No. 6,051,812 is related to "Snow and ice melting blanket device." The device of the invention comprises a tarpaulin including a top layer, a bottom layer and a third conductive middle layer positioned between the top and bottom layers. A sensing device senses a predetermined weight of snow and ice accumulated atop the tarpaulin causing the conductive middle layer and tarpaulin to heat up and melt the accumulated snow and ice thereby keeping the tarpaulin free of snow and ice.

Patent with publication number U.S. Pat. No. 5,854,470 is related to "Snow melting mat system". The device of the invention comprises a mat having a plurality of drain slots, a tube projecting within the mat, a pump connected to both ends of the tube for circulating heated oil, and a heating coil surrounding a portion of the tube for heating the oil within the tube during circulation.

Patent with publication number U.S. Pat. No. 4,967,057 is related to "Snow melting mat system". The device of the invention comprises individual electrically heated mats, self-regulated by use of an electrical element whose resistance varies proportionately with its temperature, used for covering walking areas to prevent accumulation of snow and ice.

Patent with publication number U.S. Pat. No. 8,276,972 is related to "Undercarriage fairing". The device of the invention comprises an airstream deflector fairing includes a rear or aft end and a lower bottom portion of the fairing includes a panel facing the ground at an angle which in turn directs an airstream passing thereunder downwardly and outwardly relative to the undercarriage and substantially at an area below a trailing axle downstream from the fairing.

Patent with publication number U.S. Pat. No. 4,499,365 is related to "Portable heater for radiantly heating the underbody of a motor vehicle". The device of the invention comprises a portable heater for radiantly heating the underbody, particularly the engine oil pan or crankcase, of a motor vehicle to facilitate starting in cold weather includes an elongate wheeled support member horizontally positionable adjacent and under the vehicle by a handle on one end of the support member; and a radiant energy generator, such as a conventional infrared lamp or an electric resistance element, is mounted on the support member and oriented to project a beam of radiant energy substantially parallel to and along the longitudinal axis of the support member to a planar reflector on the support member downstream of the generator and disposed at an angle to reflect the beam of radiant energy upwardly to portion of the vehicle underbody desired to be heated.

Patent with publication number U.S. Pat. No. 6,946,621 is related to "Automotive safety device for melting snow and ice from roadways." The device of the invention comprises an automotive vehicle safety device for melting ice and snow on roadways and in areas immediately adjacent to the vehicle tires includes ductwork extending from a heater mounted adjacent the vehicle engine with the ductwork terminating at front and rear undercarriage mounted v-shaped ducts.

The above documents fail to disclose an apparatus of an electrical system connecting a plurality of heating elements composed of aviation grade silicone heating elements installed on the roof of a van semi-trailer, under the deck plates of a flatbed semi-trailer, or on the twist-lock of a container chassis without altering the configuration of the aforementioned trailer types.

As a result, due to the inadequacies that are mentioned above and the insufficiency of the current solutions regarding the issue, an improvement is considered necessary in the technical field.

SUMMARY

The invention is directed to semi trailer and intermodal chassis de-icing systems. Such a system or systems prevent the formation of ice and/or snow, and can be used to melt ice and/or snow on a roof, deck, or twist-lock of a shipping container chassis without altering the configuration of a roof, deck or twist-lock. The system melts snow and ice, and prevents the buildup of snow and ice, on semi-trailers, cargo vans, and intermodal shipping container chassis trailers. The system can further be configured to serve as a system for ice removal and the prevention of ice buildup on conventional intermodal railcars and intermodal well cars. The system and its components are designed to comply with FHWA, DOT and state and local regulations.

It is an object of the invention to provide a system which complies with federal, state and local highway regulations. Such a system is designed to be in compliance with regulations set forth in Title 23, section 658 of the Code of Federal Regulations, which governs the overall dimensions of semi-trucks, semi-trailers and other transportation and logistical transport systems. By way of example, and not limitation, the use of silicone coated heating elements is intended to comply with Federal Highway Administration (FHWA) height regulations; specifically, wherein the maximum height of a tractor-trailer is 13 feet 6 inches.

It is a further object of the invention to provide a system which is capable of being integrated into existing semi-trailer and intermodal chassis systems as well as being installed in new semi-trailer and intermodal chassis systems. Implementation of such a system is intended to be relatively inexpensive. Moreover, implementation of such a system is intended to be simple and straightforward.

At its essence, the semi-trailer and intermodal chassis de-icing system includes a power supply, a semi-trailer having at least one surface; a plurality of heating elements mounted to, and spaced apart at regular intervals from one another, the at least one surface of the said semi-trailer, at least one temperature sensor, at least one processor, and memory having computer executable instructions which, when executed by the at least one processor, cause the system for the removal and prevention of ice accumulation on semi-trailers to allow a user to program a desired temperature of the semi-trailer having at least one surface; sense a temperature of the at least one surface of the semi-trailer; heat the semi-trailer surface with the said plurality of heating elements spaced apart at regular intervals from one another; and maintain the said desired temperature of the at least one surface of the semi-trailer. Such a system can be configured with new semi-trailers or can be manufactured and sold as a retrofit kit.

The invention also is directed to a system for the removal and prevention of ice accumulation on semi-trailers and container chassis trailers, the system comprising a power supply; a semi-trailer having at least one surface and a plurality of twist-lock fittings for container chassis trailers; a plurality of aviation grade heating elements mounted to, and spaced apart at regular intervals from one another, the at least one surface of the said semi-trailer; one or more aviation grade heating elements placed on the said plurality of twist-lock fittings for container chassis trailers; at least one temperature sensor; at least one processor; and memory having computer executable instructions which, when executed by the at least one processor, cause the semi-trailer de-icing system to allow a user to program a desired temperature of the semi-trailer having at least one surface; sense a temperature of the semi-trailer; heat the semi-trailer surface with the said plurality of heating elements spaced apart at regular intervals from one another; and maintain the said desired temperature of the at least one surface of the twist-locks for container chassis trailers.

A retrofit kit can comprise a plurality of heating elements to be spaced apart at regular intervals from one another on at least one surface of a semi-trailer; at least one temperature sensor to be placed in proximity to the said heating elements to be spaced apart at regular intervals from one another on at least one surface of a semi-trailer; and a temperature controller unit including at least one processor and memory having computer executable instructions which, when executed by the at least one processor, cause the semi-trailer de-icing system to allow a user to program a desired temperature of the semi-trailer having at least one surface; sense a temperature of the semi-trailer; heat the semi-trailer surface with the said plurality of heating elements spaced apart at regular intervals from one another; and maintain the said desired temperature of the semi-trailer having at least one surface. Embodiments of the retrofit kit also include heating elements configured to be mounted to the frames of a plurality of twist-locks for standard intermodal freight railcars, well cars, and container chassis trailers. Such a kit will also include appropriate wiring and electrical power connectors.

To avoid altering the configuration of a semi-trailer, the system may utilize at least one surface of a semi-trailer on which a plurality of heating elements are attached or mounted. Such a surface includes, but is not limited to, the roof of a van or semi-trailer, the aluminum deck and steel cross beams of a flatbed semi-trailer, and the twist-lock of a container chassis to support an electrical system. The heating elements are composed of flexible silicone rubber and are attached to a roof, attached under the deck of a semi-trailer, or attached to twist-lock mechanisms commonly found on intermodal shipping container transport systems. The system is connected to an auxiliary power unit (APU) or fixed generator and forms an electrical de-icing system. The heating elements, which may include a built-in pressure sensitive thermal conductive adhesive, can be directly applied to a roof, deck plating or twist-lock to keep a surface warm; to prevent ice buildup and/or for de-icing existing buildup. For these aviation silicone heaters, the use of embodiments of the invention, an aero-epoxy adhesive is applied to ensure proper bonding of the heating elements to at least one surface of a semi-trailer.

Stated differently, the invention comprises a de-icing system, wherein the system comprises: a roof, deck plates, cross bearings and/or twist-locks of a semi-trailer; an auxiliary power unit or fixed generator; a temperature controller; a switch unit coupled to the auxiliary power unit and the temperature controller; an electrical system, the electrical system comprising a plurality of silicone rubber conductive heating elements coupled to the auxiliary power unit or generator and temperature controller, wherein the plurality of silicone rubber heating elements are linked to each other via a SSR (solid state relay) wherein the silicone rubber conductive heating elements are arranged in a pattern; and a single temperature sensor is coupled to the electrical circuit; wherein heat conductive wiring and the electrical heat sensor wiring are encapsulated by a rubber insulation layer.

In further embodiments, the system for the removal and prevention of ice accumulation on semi-trailers and container chassis trailers further comprises a plurality of conductive heating elements which are aviation grade silicone heaters and thermal conductive adhesives.

In further embodiments, the system for the removal and prevention of ice accumulation on semi-trailers and container chassis trailers comprises an auxiliary power unit or generator, a temperature controller, a switch unit, a temperature sensor, a temperature display, and a SSR (solid state relay).

In further embodiments, the system for the removal and prevention of ice accumulation on semi-trailers and container chassis trailers further comprises aviation grade silicone heating elements wherein the aviation grade silicone heating elements are a wire-wound style or etched foil flexible silicone heaters.

In further embodiments, the system for the removal and prevention of ice accumulation on semi-trailers and container chassis trailers further comprises wherein the thickness of each heating element of the plurality of conductive heating elements is in a range of 0.037 mm (about 0 in) to 2 mm (about 0.08 in).

In further embodiments, the system for the removal and prevention of ice accumulation on semi-trailers and container chassis trailers further comprises an array of heating elements affixed to a surface of a semi-trailer wherein the thermal conductive adhesive has a continuous operating temperature up to 120 degrees Fahrenheit.

In further embodiments, the system for the removal and prevention of ice accumulation on semi-trailers and container chassis trailers further comprises an auxiliary power unit wherein the auxiliary power unit (APU) provides voltage at 12 volts. Such an auxiliary power unit can be mounted to a semi-truck by various means and methods.

In other embodiments, the system for the removal and prevention of ice accumulation on semi-trailers and container chassis trailers further comprises a power supply including a commercial generator wherein the fixed commercial generator provides voltage at 240 volts. Commercial generators can be used in freight terminals, or other locations where semi-trucks are often parked.

In various embodiments, the system for the removal and prevention of ice accumulation on semi-trailers and container chassis trailers comprises a plurality of conductive heating elements ranging from 12 to 20. However, other embodiments may include numbers fewer or greater.

In embodiments of the invention, the system for the removal and prevention of ice accumulation on semi-trailers and container chassis trailers includes one or more temperature sensors connected to a temperature controller.

In various embodiments, the system for the removal and prevention of ice accumulation on semi-trailers and container chassis systems provides a temperature controller system wherein a temperature of the surface is maintained between 75- and 110-degrees Fahrenheit.

In further embodiments, the system for the removal and prevention of ice accumulation on semi-trailers and container chassis trailers includes heating elements arranged in a matrix having a plurality of rows and a plurality of columns.

In further embodiments, the system for the removal and prevention of ice accumulation on semi-trailers and container chassis trailers further comprises spacing distances between each of the conductive heating elements are the same in any of the rows or the columns, or spacing distances between some or all the conductive heating elements are different in any of the rows or the columns.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims may be learned by the practice of the invention as set forth hereinafter.

BRIEF DESCRIPTION OF THE DRAWINGS

The invention directed by way of example, and not by way of limitation, in the figures of the accompanying drawings and in which like reference numerals refer to similar elements and in which.

Figure 1:
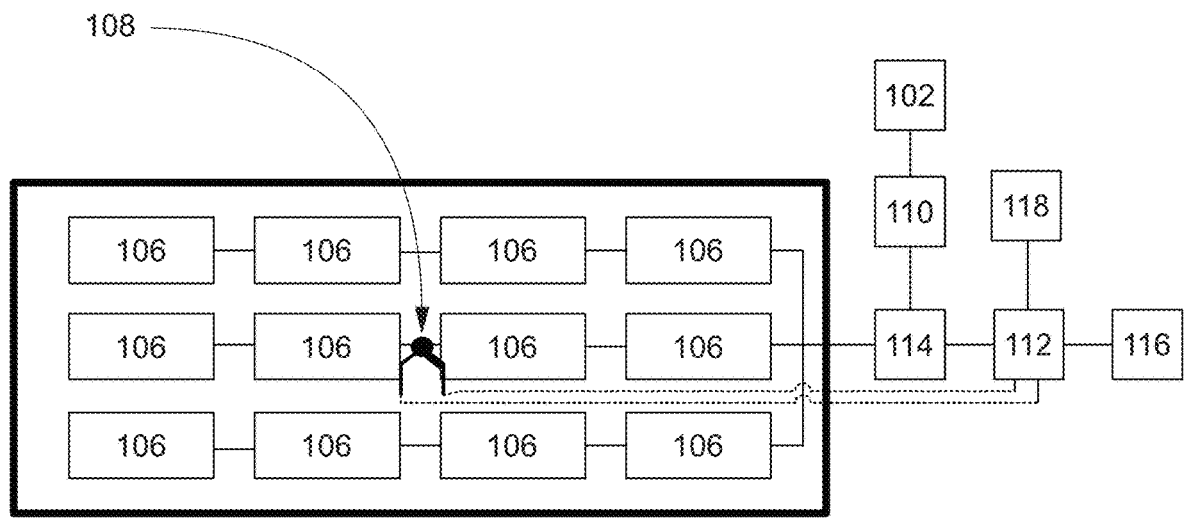
FIG. 1 is an illustration of a semi-trailer configuration of heating units and wiring connected to an auxiliary power unit in accordance with an embodiment of the invention.

Unless otherwise indicated illustrations in the figures are not necessarily drawn to scale.

DETAILED DESCRIPTION OF THE PREFERRED EMBODIMENTS

Terminology used herein is used for the purpose of describing particular embodiments only and is not intended to limit the scope of the present invention. It must be understood that as used herein and in the appended claims, the singular forms "a," "an," and "the" include the plural reference unless the context clearly dictates otherwise. For example, a reference to "an element" is a reference to one or more elements and includes all equivalents known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Language that may be construed to express approximation should be so understood unless the context clearly dictates otherwise.

Unless defined otherwise, all technical and scientific terms used herein have the same meanings as commonly understood by a person of ordinary skill in the art to which this invention belongs. Preferred methods, techniques, devices, and materials are described. But any methods, techniques, devices, or materials similar or equivalent to those described herein may be used in the practice or testing of the present invention. Structures described herein should also be understood to refer to functional equivalents of such structures.

References to "one embodiment," "one variant," "an embodiment," "a variant," "various embodiments," "numerous variants," etc., may indicate that the embodiment(s) of the invention so described may include particular features, structures, or characteristics. However, not every embodiment or variant necessarily includes the particular features, structures, or characteristics. Further, repeated use of the phrase "in one embodiment," or "in an exemplary embodiment," or "a variant," or "another variant," do not necessarily refer to the same embodiment although they may. A description of an embodiment with several components in communication with each other does not imply that all such components are required. On the contrary, a variety of optional components are described to illustrate the wide variety of possible embodiments and/or variants of the present invention.

A "computer" may refer to one or more apparatus and/or one or more systems that are capable of accepting a structured input, processing the structured input according to prescribed rules, and producing results of the processing as output. Examples of a computer may include: a personal computer (PC); a stationary and/or portable computer; a computer having a single processor, a computer having multiple processors, or a computer having multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer; a personal digital assistant (PDA); a portable telephone; a portable smartphone; wearable devices such as smartwatches; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

The term "processor" may refer to any device or portion of a device that processes electronic data from registers and/or memory to transform that electronic data into other electronic data that may be stored in registers and/or memory. A "computing platform" may comprise one or more processors.

A "computer monitor" or "display" is an output device that displays information in pictorial form. A monitor usually comprises the visual display, circuitry, casing, and power supply. The display device in modern monitors is typically a thin film transistor liquid crystal display (TFT-LCD) with LED backlighting having replaced cold-cathode fluorescent lamp (CCFL) backlighting. Monitors are typically connected to computers via VGA, Digital Visual Interface (DVI), S-Video, HDMI, DisplayPort, Thunderbolt, low-voltage differential signaling (LVDS) or other proprietary and/or integrated connectors and signals.

It will be readily understood by persons skilled in the art that the various methods and algorithms described herein may be implemented by appropriately programmed computers and computing devices. Typically, a processor (e.g., a microprocessor) will receive instructions from a memory or memory-like device, and execute those instructions, thereby performing a process defined by those instructions. Further, programs that implement such methods and algorithms may be stored and transmitted using a variety of known media.

"Software" may refer to prescribed rules and/or instructions used to operate a computer. Examples of software may include code segments in one or more computer-readable languages; graphical and or/textual instructions; applets; pre-compiled code; interpreted code; compiled code; and computer programs. An operating system or "OS" is software that manages computer hardware and software resources and provides common services for computer programs.

Certain embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including object-oriented programming languages and/or conventional procedural programming languages, and/or programming languages or other compilers, assemblers, interpreters or other computer languages or platforms.

A "computer system" may refer to a system having one or more computers, where each computer may include a computer-readable medium employing software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "silicone heating element" is a flexible heating element comprising a silicone rubber material that is designed to provide uniform and efficient heat transfer in a wide range of applications. Such a heating element consists of an electrically resistant wire or material, such as nickel-chromium or copper-nickel, that is embedded in a silicone rubber substrate. The element is then bonded to a thin layer of fiberglass or other insulating material. Silicone heating elements are known in the art for their flexibility and durability, as well as their ability to withstand high temperatures and harsh environments. Silicone heating elements are typically used in applications where a flat or curved surface needs to be heated, such as in industrial processes, medical equipment, and aerospace applications. Silicone heating elements are well known to conform to irregular surfaces, which makes them ideal for use in equipment that has complex geometries or tight spaces. They can also be readily customized to specific shapes and sizes, which allows for a high degree of design flexibility. Silicone heating elements are available in a wide range of power ratings, from a few watts to several kilowatts, and can be designed to operate at different voltages and frequencies. They can also be equipped with temperature sensors and other control devices to ensure precise temperature control and protection against overheating.

A "semi-trailer" is a trailer without a front axle. The combination of a semi-trailer and a tractor truck is called a semi-trailer truck (also known simply as a "semi-trailer", "tractor trailer", or "semi" in the United States)

A "semi-trailer truck" is the combination of a tractor or truck unit and one or more semi-trailers to carry freight. A semi-trailer attaches to the tractor or truck with a type of hitch called a fifth wheel. The combination vehicles made up of a powered semi-tractor or truck and one or more semi-trailers are known as "semis," "semi-trailers," "tractor-trailers," "big rigs," "semi-trucks," "eighteen-wheelers," or "semi-tractor-trailers."

"Intermodal shipping" refers to moving freight or cargo by two or modes of transportation. By loading freight or cargo into containers, shipments of freight or cargo can be moved between trucks, trains and cargo ships.

An "intermodal container" or "shipping container" or "cargo container" is a large metal crate designed and built for intermodal shipping. Such containers can be used across different modes of transport without unloading and reloading freight or cargo into different containers. Intermodal containers are primarily used to store and transport materials and products efficiently and securely in the global containerized intermodal freight transport system. Intermodal shipping container sizes, measurements, and weight specifications been standardized under ISO 668.

A "container chassis," also called "intermodal chassis" or "skeletal trailer," is a type of semi-trailer designed to securely carry an intermodal shipping container. Intermodal chassis systems are used by truckers to deliver intermodal shipping containers between ports, railyards, container depots, and shipper facilities.

"Twist-locks," or "container twist-locks," or "manual twist-locks" are used on container ships and flatbed shipping container semi-trailers for securing shipping containers above deck and onto shipping container semi-trailers. A "twist lock" or "twist-lock," together with matching corner castings or corner fittings, as defined in norms including ISO 1161:1984, form a standardized (rotating) male/female connector system, for connecting and securing intermodal, and predominantly ISO-standard international shipping containers.

As is well known to those skilled in the art, many careful considerations and compromises typically must be made when designing the optimal manufacture or commercial implementation of such a system for the removal and prevention of ice accumulation on semi-trailers. A commercial implementation in accordance with the spirit and teachings of the invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art.

The exemplary system for the removal and prevention of ice accumulation on semi-trailers now be described in detail with reference to embodiments thereof as illustrated in the accompanying drawings. Unless otherwise indicated illustrations in the figures are not necessarily drawn to scale.

FIG. 1 is an illustration of a semi-trailer configuration of heating units and wiring connected to an auxiliary power unit in accordance with an embodiment of the invention. For purposes of this application, a top view of a 28-foot by 102-inch semi-trailer is shown as an example. However, semi-trailers of differing lengths such as 48-foot and 53-foot trailers can be utilized as well. Furthermore, the invention can be readily applied to intermodal shipping containers and other flat-bed semi-trailer applications. Thus, the term "semi-trailer" is to be interpreted broadly as semi-trailers having differing lengths and widths and heights can be utilized in various embodiments of the invention.

In embodiments of the invention, the system for the removal and prevention of ice accumulation on semi-trailers includes a power supply. In one such embodiment, the power supply is an auxiliary power unit (APU) 102 from a semi-truck. By way of example, and not limitation, the system can employ a diesel engine powered Dynasys™ GEN3K as an APU. Such a self-contained auxiliary power unit can not only power such a system but can provide power for a wide variety of devices utilized in a semi-truck's sleeper cab. Moreover, auxiliary power units are being increasingly utilized by semi-truck operators for climate control. Persons skilled in the art will appreciate the utility of an APU as it saves both fuel and wear and tear on a semi-truck's engine. Persons skilled in the art will understand a wide variety of power switches known and appreciated in the art 110 allow for the system to be turned on and off.

The invention further includes a semi-trailer having at least one surface 104. Persons skilled in the art will appreciate that the at least one surface is likely the roof or the floor of a semi-trailer. However, other surfaces such as the sidewalls or the front and rear of the trailer can be used as well. In some embodiments of the invention, the at least one surface can be shipping container twist-lock frames mounted to a semi-trailer chassis.

Embodiments of the invention include a plurality of heating elements 106. The heating elements can be mounted to, and spaced apart at regular intervals from one another, the at least one surface of the said semi-trailer. In various embodiments of the invention, aviation grade silicone rubber heating elements including either wire-wound elements or etched foil construction are utilized. By way of example, and not limitation, Tempco® wire-wound element construction and Tempco® etched foil construction heating elements are utilized. Such heating elements are capable of operating under adverse conditions such as moisture, exposure to temperature extremes, ultraviolet radiation, and exposure to chemicals such as, but not limited to, solvents, hydrocarbons, ozone, and industrial chemical precursors. Wire-wound elements consist of resistance wire wound on a fiberglass cord for added support and flexibility.

In embodiments of the invention, the heating elements 106 have a thickness of less than 2 millimeters, which is intended to keep semi-trailer dimensions in compliance with Department of Transportation (DOT) and Federal Highway Administration (FHWA) height regulations. Each element can be laid out in a special designed pattern to fit application requirements such as, but not limited to, ensuring a uniform heat profile or to concentrate the heat profile in a specific section(s) of the heater, conforming to the size and shape of the silicone rubber heater, and avoiding holes and cutouts. Etched foil construction elements are made with a thin metal foil (0.001"), usually a nickel base alloy, as the resistance element. The resistance pattern to be etched is specially designed and transferred to the foil, which is laminated to the insulating substrate; the element/substrate is then processed through an acid spray to produce the desired resistance pattern; the top layer is then added and vulcanized. Both wire-wound elements and etched-foil construction elements have an effective operating range from −70 degrees Fahrenheit up to +500 degrees Fahrenheit. Lead elements can be located anywhere on each heating element.

In embodiments of the invention, an array or matrix of twelve heating elements 106 having dimensions of 82 inches in length and 18 inches in width are spaced apart 4 lengthwise and 3 widthwise. However, it will become apparent to persons having skill in the art that the number of heating elements may vary. Furthermore, the dimensions of each heating element may vary. Finally, the spacing apart of heating elements is not strictly confined to regular intervals. In various embodiments of the invention, the heating elements are attached with adhesives known and appreciated in the art.

The invention includes at least one temperature sensor 108. In one embodiment of the invention, the temperature sensor is located centrally among the plurality of heating elements arranged in a matrix or array. The at least one temperature sensor measures the temperature of at least one surface of a semi-trailer. Persons having skill in the art will appreciate that numerous temperature sensors and thermocouple devices are available and readily configurable to the system.

The invention further includes a temperature controller 112. In embodiments of the invention, the temperature controller is a computer system having at least one processor and memory having computer executable instructions which, when executed by the at least one processor, cause the system for the removal and prevention of ice accumulation on semi-trailers to allow a user to program a desired temperature of the semi-trailer having at least one surface; sense a temperature of the at least one surface of the semi-trailer; heat the semi-trailer surface with the said plurality of heating elements spaced apart at regular intervals from one another; and maintain the said desired temperature of the at least one surface of the semi-trailer. The temperature controller can be connected to a temperature display 116 and an alarm mechanism 118.

A contactor or solid state relay (SSR) 114 is utilized to open and close the circuit containing the plurality of heating elements. Persons skilled in the art will appreciate that numerous contactor or SSR devices can be utilized to send electrical current to the array or matrix containing a plurality of heating elements.

Figure 2:
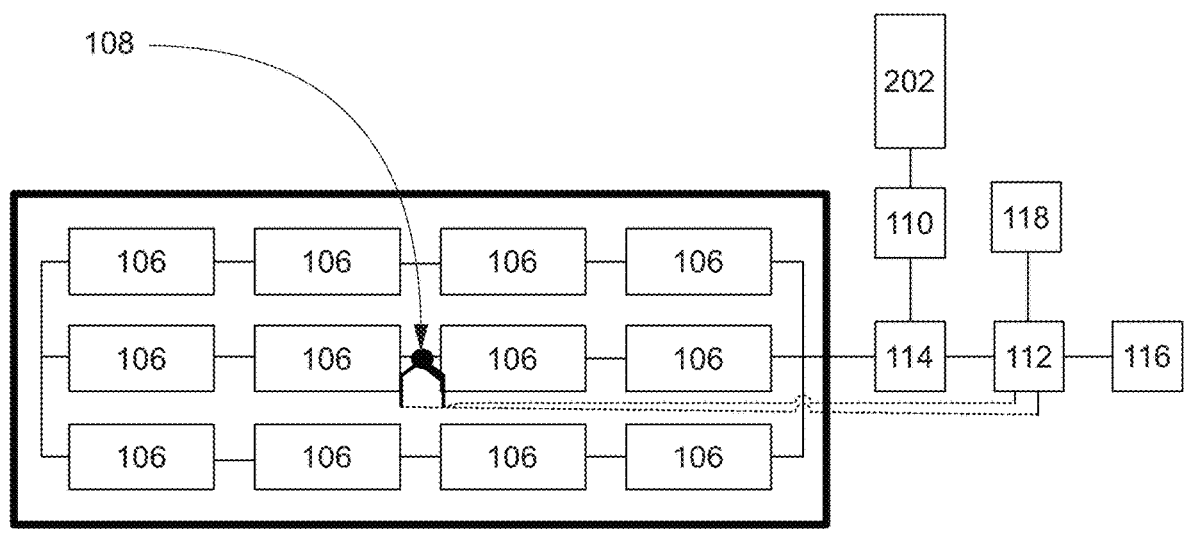
FIG. 2 is an illustration of a semi-trailer configuration of heating units and wiring connected to a fixed generator unit in accordance with an embodiment of the invention.

FIG. 2 is an illustration of a semi-trailer configuration of heating units and wiring connected to a fixed generator unit in accordance with an embodiment of the invention. For purposes of this application, a top view of a 28-foot by 102-inch semi-trailer is shown as an example. However, semi-trailers of differing lengths such as 48-foot and 53-foot trailers can be utilized as well. Furthermore, the invention can be readily applied to intermodal shipping containers and other flat-bed semi-trailer applications. The term "semi-trailer" is to be interpreted broadly as semi-trailers having differing lengths and widths and heights can be utilized as well.

In embodiments of the invention, the system for the removal and prevention of ice accumulation on semi-trailers includes a power supply. In one such embodiment, the power supply is a commercial grade generator. By way of example, and not limitation, the system can employ a diesel engine powered Kubota® Lowboy II-GL11000, 11 kW Standby, 10 kW Prime, Single-Phase, 120-240 Volt generator. However, it will be readily apparent to persons having skill in the art that other such power generators can be used. Furthermore, the power supply could simply be from what is commonly understood as the power grid. Persons skilled in the art will understand a wide variety of power switches 110 known and appreciated in the art allow for the system to be turned on and off.

The invention further includes a semi-trailer having at least one surface 104. Persons skilled in the art will appreciate that the at least one surface is likely the roof or the floor of a semi-trailer. However, other surfaces such as the sidewalls or the front and rear of the trailer can be used as well. In other embodiments of the invention, the at least one surface can be Embodiments of the invention include a plurality of heating elements 106 spaced apart at regular intervals from one another. In various embodiments of the invention, aviation grade silicone heating elements either wire-wound elements or etched foil construction are utilized. By way of example, and not limitation, Tempco® wire-wound element construction and Tempco® etched foil construction heating elements are utilized. Wire-wound elements consist of resistance wire wound on a fiberglass cord for added support and flexibility. Each element can be laid out in a special designed pattern to fit application requirements such as, but not limited to, ensuring a uniform heat profile or to concentrate the heat profile in a specific section(s) of the surface to be heated, conforming to the size and shape of each heating element, and avoiding holes and cutouts. Etched foil construction elements are made with a thin metal foil (0.001"), usually a nickel base alloy, as the resistance element. The resistance pattern to be etched is specially designed and transferred to the foil, which is laminated to the insulating substrate; the element/substrate is then processed through an acid spray to produce the desired resistance pattern; the top layer is then added and vulcanized. Both wire-wound elements and etched-foil construction elements have an effective operating range from −70 degrees Fahrenheit up to +500 degrees Fahrenheit. Lead elements can be located anywhere on each heating element. In embodiments of the invention, an array or matrix of twelve heating elements having dimensions of 82 inches in length and 18 inches in width are spaced apart 4 lengthwise and 3 widthwise. However, it will become apparent to persons having skill in the art that the number of heating elements may vary. Furthermore, the dimensions of each heating element may vary. Finally, the spacing apart of heating elements is not strictly confined to regular intervals. In various embodiments of the invention, the heating elements are attached with adhesives known and appreciated in the art.

The invention includes at least one temperature sensor 108. In one embodiment of the invention, the temperature sensor is located centrally among the plurality of heating elements arranged in a matrix or array. In one embodiment of the invention, the at least one temperature sensor is a thermocouple unit. Other embodiments may include thermistor units. The at least one temperature sensor measures the temperature of at least one surface of a semi-trailer. Persons having skill in the art will appreciate that numerous temperature sensors and thermocouple devices are available and readily configurable to the system.

The invention further includes a temperature controller 112. In embodiments of the invention, the temperature controller is a computer system having at least one processor and memory having computer executable instructions which, when executed by the at least one processor, cause the system for the removal and prevention of ice accumulation on semi-trailers to allow a user to program a desired temperature of the semi-trailer having at least one surface; sense a temperature of the at least one surface of the semi-trailer; heat the semi-trailer surface with the said plurality of heating elements spaced apart at regular intervals from one another; and maintain the said desired temperature of the at least one surface of the semi-trailer. The temperature controller can be connected to a temperature display 116 and an alarm mechanism 118.

A contactor or solid state relay (SSR) 114 is utilized to open and close the circuit containing the plurality of heating elements. Persons skilled in the art will appreciate that numerous contactor or SSR devices can be utilized to send electrical current to the array or matrix containing a plurality of heating elements. Moreover, persons skilled in the art will understand that numerous means to govern such a solid state relay are available in conjunction with a temperature controller or processor.

Figure 3A:
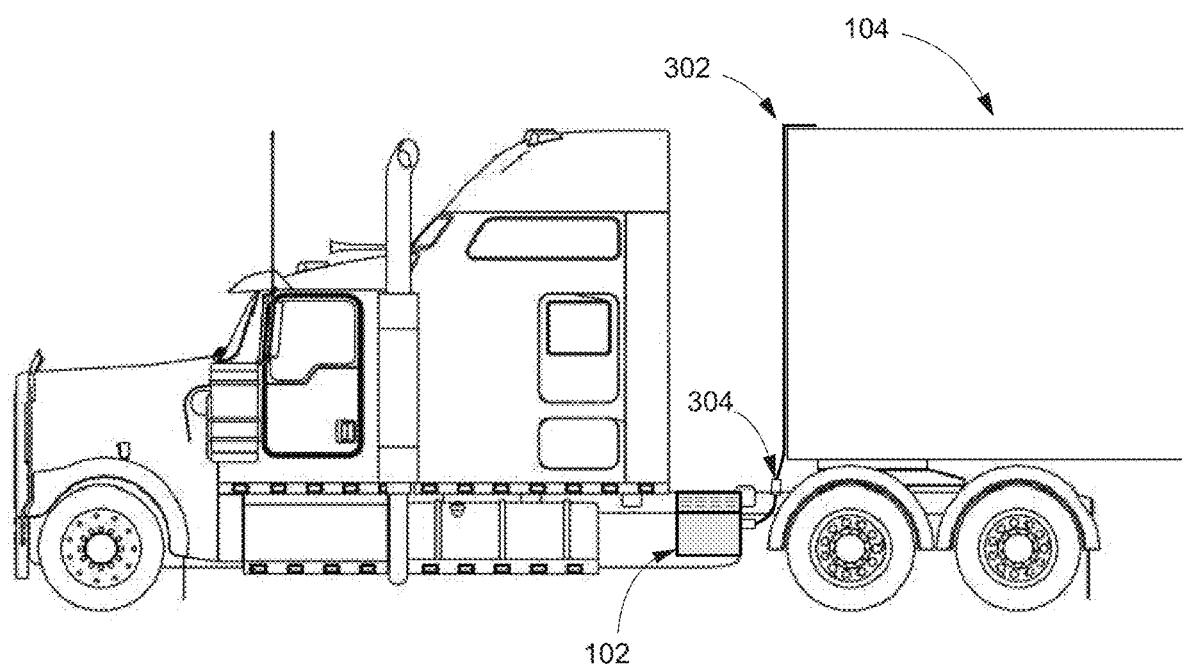
FIG. 3A is an illustration of a semi-trailer truck connected to a semi-trailer utilizing an auxiliary power unit (APU) in accordance with an embodiment of the invention.

FIG. 3A is an illustration of a semi-trailer truck connected to a semi-trailer utilizing an auxiliary power unit (APU) 102 in accordance with an embodiment of the invention. By way of example, and not limitation, the system can employ a diesel engine powered Dynasys™ GEN3K as an APU 102. Persons skilled in the art will understand that such an auxiliary power unit can be mounted to the side of a semi-truck frame between the diesel fuel tank and the drive tires. Wiring 302 is shown mounted to the bulkhead of the trailer wall that is attached to the apron of the trailer. In embodiments of the invention, a connector 304 is utilized to connect wiring between different components of the system. In one embodiment of the invention, cannon plugs are utilized. However, it will be readily apparent to persons skilled in the art that other such power connector units can be used.

Figure 3B:
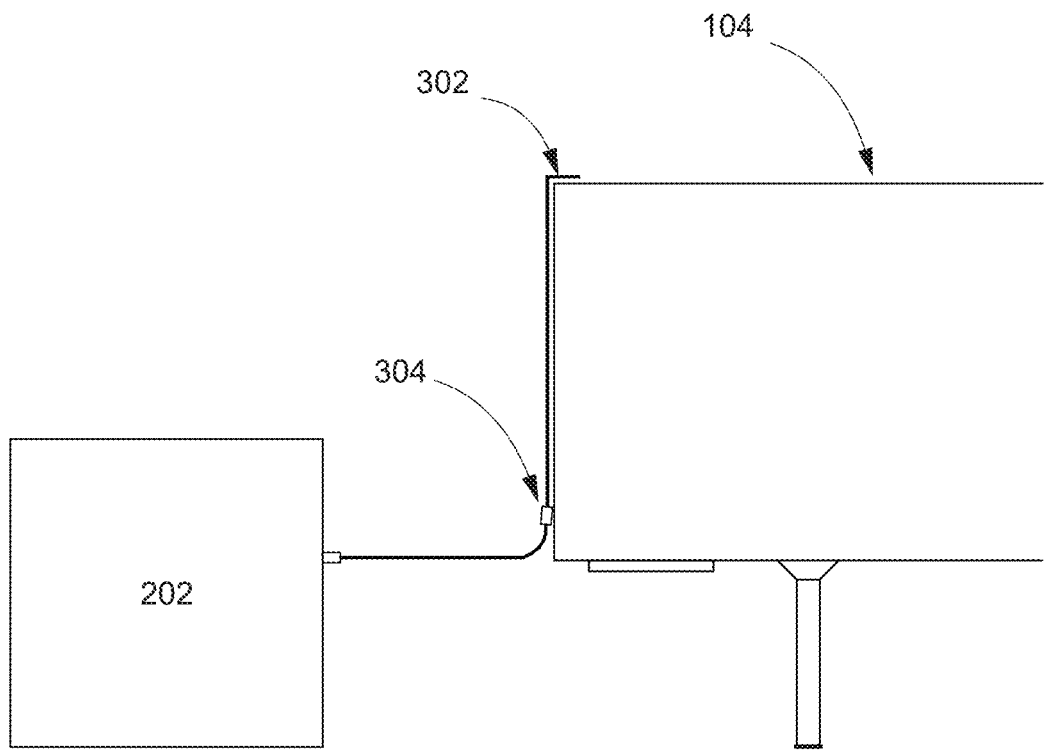
FIG. 3B is an illustration of a semi-trailer utilizing a fixed generator in accordance with an embodiment of the invention.

FIG. 3B is an illustration of a semi-trailer 104 utilizing a fixed generator 202 in accordance with an embodiment of the invention. Such an embodiment employs a fixed, stand-alone generator 202 with the wiring 302 to the trailer. Wiring 302 is shown mounted to the bulkhead of the trailer wall that is attached to the apron of the trailer. The generator 202 is powering the system instead of the truck's APU 102. In embodiments of the invention, all components required to run the heating system that are mounted in the sleeper of the truck are mounted internally to the generator. By way of example, and not limitation, a temperature controller 112 can be configured to deliver power from a generator 202 so as to heat at least one surface of a semi-trailer 104. In embodiments of the invention, a connector 304 is utilized to connect wiring between different components of the system. In one embodiment of the invention, cannon plugs are utilized. However, it will be readily apparent to persons skilled in the art that other such power connector units can be used.

Figure 4A:
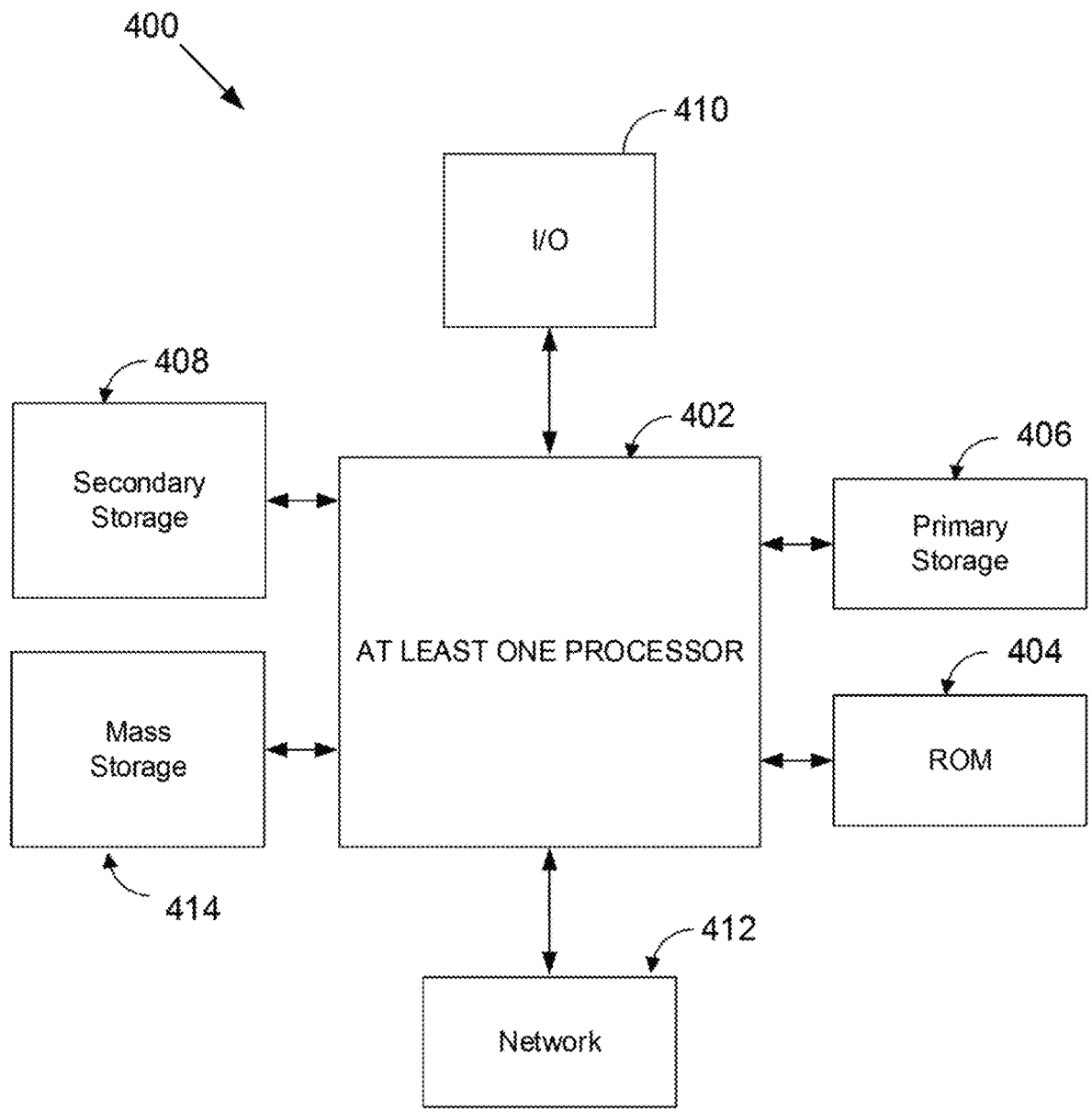
FIG. 4A illustrates a block diagram of a computer system that, when appropriately configured or designed, may serve as a computer system for which the system for the removal and prevention of ice accumulation on semi-trailers, and the components thereof, may be embodied.

FIG. 4A illustrates a block diagram of a computer system that, when appropriately configured or designed, may serve as a temperature controller 112 for which the system for the removal and prevention of ice accumulation on semi-trailers, and the components thereof, may be embodied. The computer system 400 includes at least one processor 402 (also referred to as central processing units, or CPUs) that may be coupled to storage devices including a primary storage 406 (typically a random-access memory, or RAM), a primary storage 404 (typically a read-only memory, or ROM). CPU 102 may be of various types including microcontrollers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general-purpose microprocessors. As is well known in the art, primary storage 404 acts to transfer data and instructions uni-directionally to the CPU and primary storage 406 typically may be used to transfer data and instructions in a bi-directional manner. The primary storage devices discussed previously may include any suitable computer-readable media such as those described above. A mass storage device 408 may also be coupled bi-directionally to CPU 402 and provides additional data storage capacity and may include any of the computer-readable media described above. Mass storage device 408 may be used to store programs, data and the like and typically may be used as a secondary storage medium such as a hard disk. It will be appreciated that the information retained within mass storage device 408, may, in appropriate cases, be incorporated in standard fashion as part of primary storage 406 as virtual memory. One or more components 410 such as, but not limited to, temperature sensors, temperature controllers, displays etc., can be coupled with the at least one processor so as to provide greater efficiency. A specific mass storage device such as a CD-ROM or flash memory 414 may also pass data uni-directionally to the CPU. In such an embodiment, the computer system 400 can reside in a system for the removal and prevention of ice accumulation on semi-trailers, the instructions for operating each machine being stored as memory in ROM, primary storage 404, 406 or secondary storage 408. In the preferred embodiment of the invention, a microcontroller system such as, but not limited to, the Tempco® TEC-9400 is used. However, other suitable microprocessor and/or microcontroller units can be employed.

The CPU 402 may also be coupled to an interface 410 that connects to one or more input/output devices such as track balls, mice, keyboards, microphones, touch-sensitive displays, transducer card readers, magnetic or paper tape readers, tablets, styluses, voice or handwriting recognizers, or other well-known input devices such as, of course, other computers. In the preferred embodiment, the CPU is coupled with temperature sensors and silicone heating units. Finally, CPU 402 optionally may be coupled to an external device such as a database or a computer or telecommunications or internet network using an external connection shown generally as a network 412, which may be implemented as a hardwired or wireless communications link using suitable conventional technologies. With such a connection, the CPU 402 might receive information from the network, or might output information to the network in the course of performing the method steps described in the teachings of the present invention.

It will be readily apparent to persons having skill in the art that such a computer system includes memory having computer executable instructions which, when executed by the at least one processor, to cause the system for the removal and prevention of ice accumulation on semi-trailers to allow a user to program a desired temperature of the semi-trailer having at least one surface; sense a temperature of the at least one surface of the semi-trailer; heat the semi-trailer surface with the said plurality of heating elements spaced apart at regular intervals from one another; and maintain the said desired temperature of the at least one surface of the semi-trailer. Such a system can be configured to perform additional functions as well.

Figure 4B:
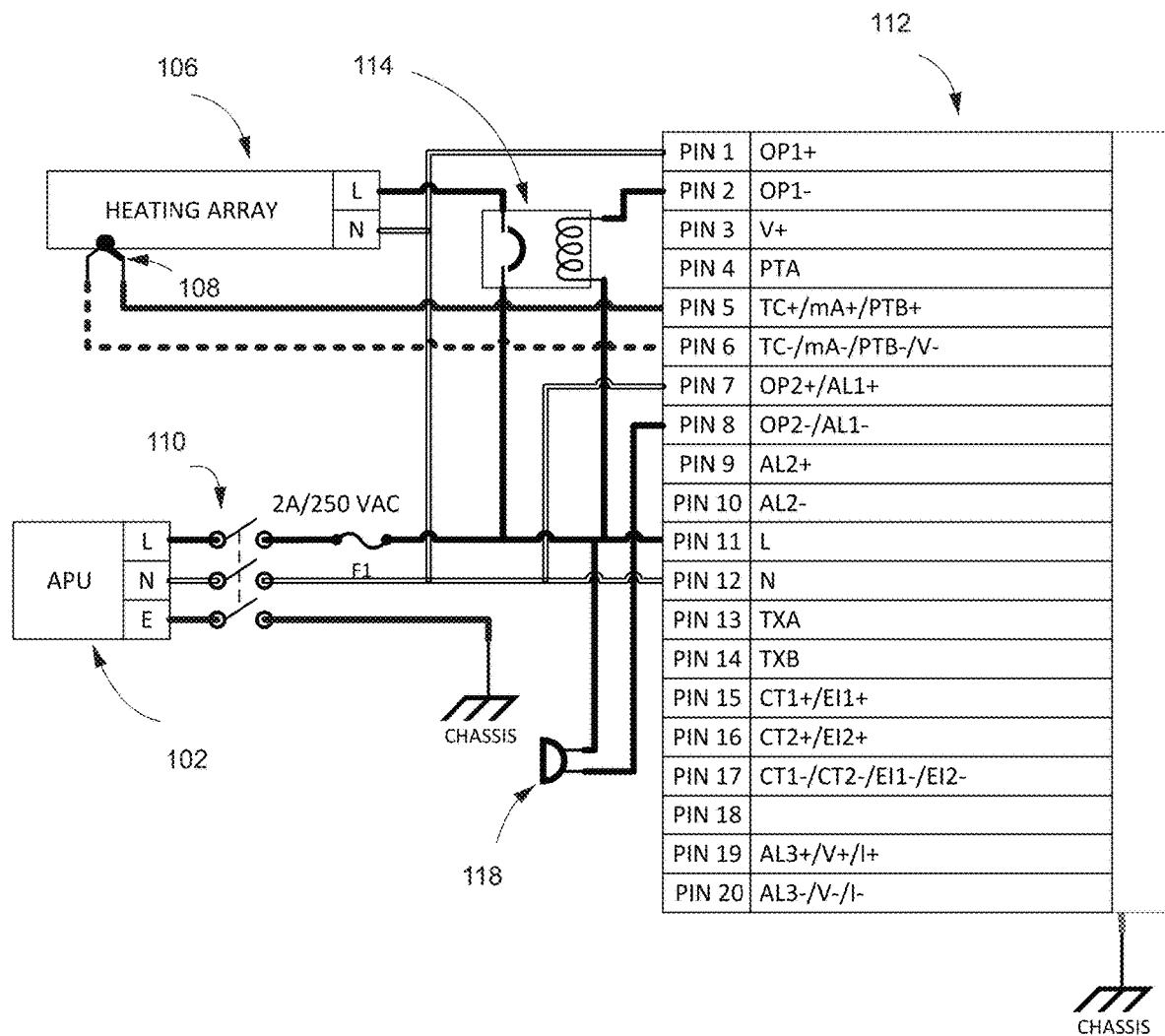
FIG. 4B represents a trailer configuration schematic comprising the de-icing system in accordance with an embodiment of the invention.

FIG. 4B represents a trailer configuration schematic comprising the de-icing system in accordance with an embodiment of the invention. In one embodiment of the invention, an auxiliary power unit (APU) 202 is powering the whole heating system via 110 AC voltage. In order to engage the heating system, the APU needs to be powered up first, and a switch unit will be opened second. Before current enters the heating system it goes through a fuse or circuit breaker which provides overcurrent protection for the whole system. The current then flows into the temperature controller 112 and the contactor or SSR 114. The temperature controller 112 controls the contactor 114 to control the flow of current, like a switch, into the array or matrix of heating elements 106. The temperature controller 112 uses a temperature sensor or thermocouple 108 to sense the current temperature of the heating elements 106. The temperature data is then fed back to the proportional-integral-derivative (PID) controller in the temperature controller 112 which then regulates the contactor or solid-state relay 114 by electronically instructing it to close the contacts if the array or matrix of heating elements 106 require a higher temperature or open the contacts if the temperature is equal to or greater than the set temperature. The temperature can be set via the temperature display 116. An alarm or speaker or LED 118 is connected to the temperature controller 112 to out various warnings. The temperature display serves as a user interface so as to give a user the ability to program the temperature controller 112 via the temperature display 116.

Figure 5:
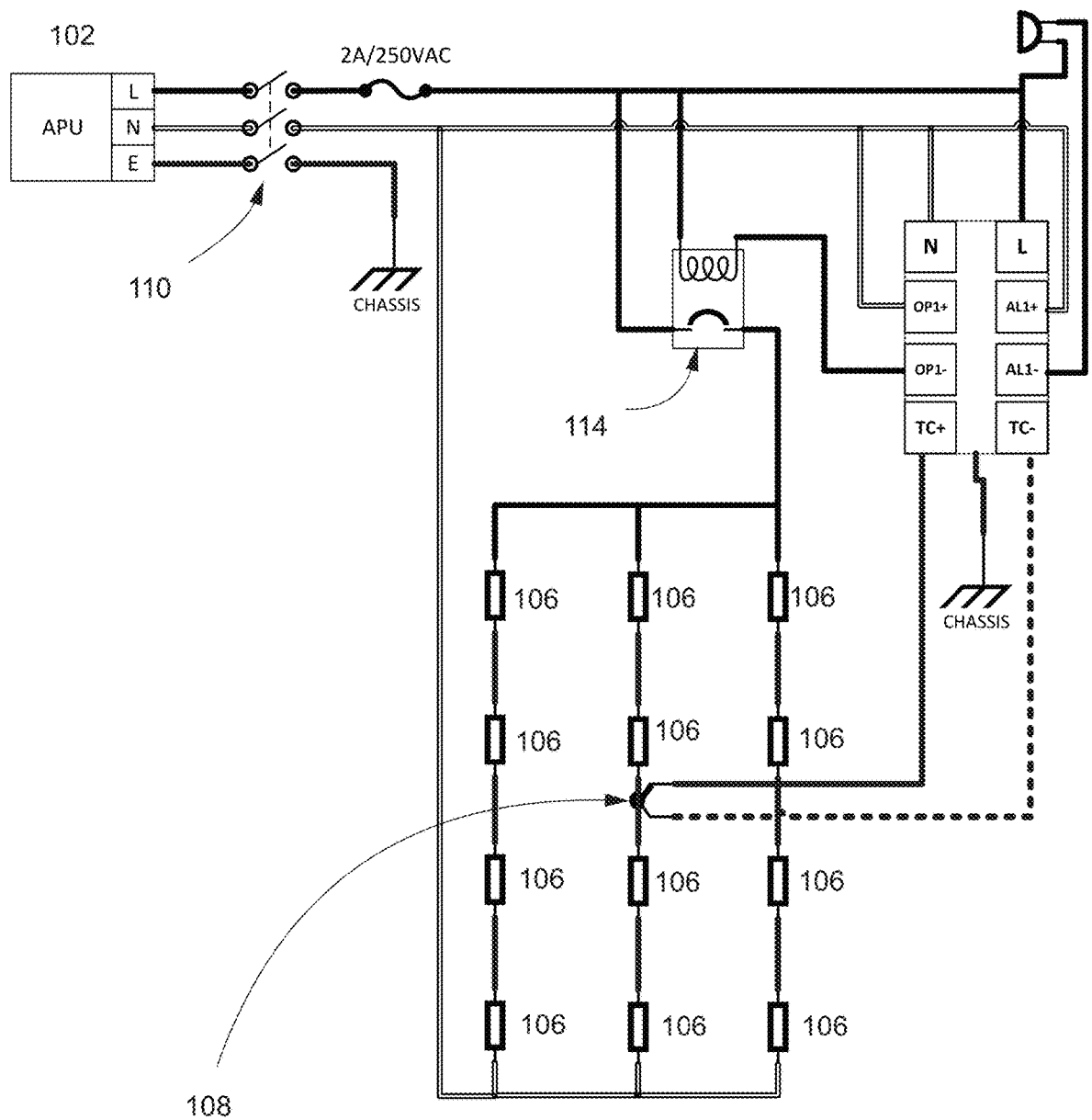
FIG. 5 represents a trailer configuration schematic depicting a representation of wiring of the system for the removal and prevention of ice accumulation on semi-trailers in accordance with an embodiment of the invention.

FIG. 5 represents a trailer configuration schematic depicting a representation of wiring of the de-icing system in accordance with an embodiment of the invention. By way of example, and not limitation, such a configuration schematic includes a matrix of 12 heating elements arranged in a 3 by 4 pattern which could be placed on a semi-trailer roof or on the undercarriage of a semi-trailer. However, numerous different configurations having different numbers of heating elements arranged in different matrices or patterns can be successfully implemented in such a system. A wide variety of power switches 110 known and appreciated in the art allow for the system to be turned on and off. A contactor or solid-state relay (SSR) 114 is utilized to open and close the circuit containing the plurality of heating elements per machine readable instructions programmed on a temperature controller. Persons having skill in the art, however, will appreciate that numerous other wiring configurations and schematics are capable of being implemented. The invention includes at least one temperature sensor 108. In one embodiment of the invention, the temperature sensor is located centrally among the plurality of heating elements arranged in a matrix or array.

Figure 6:
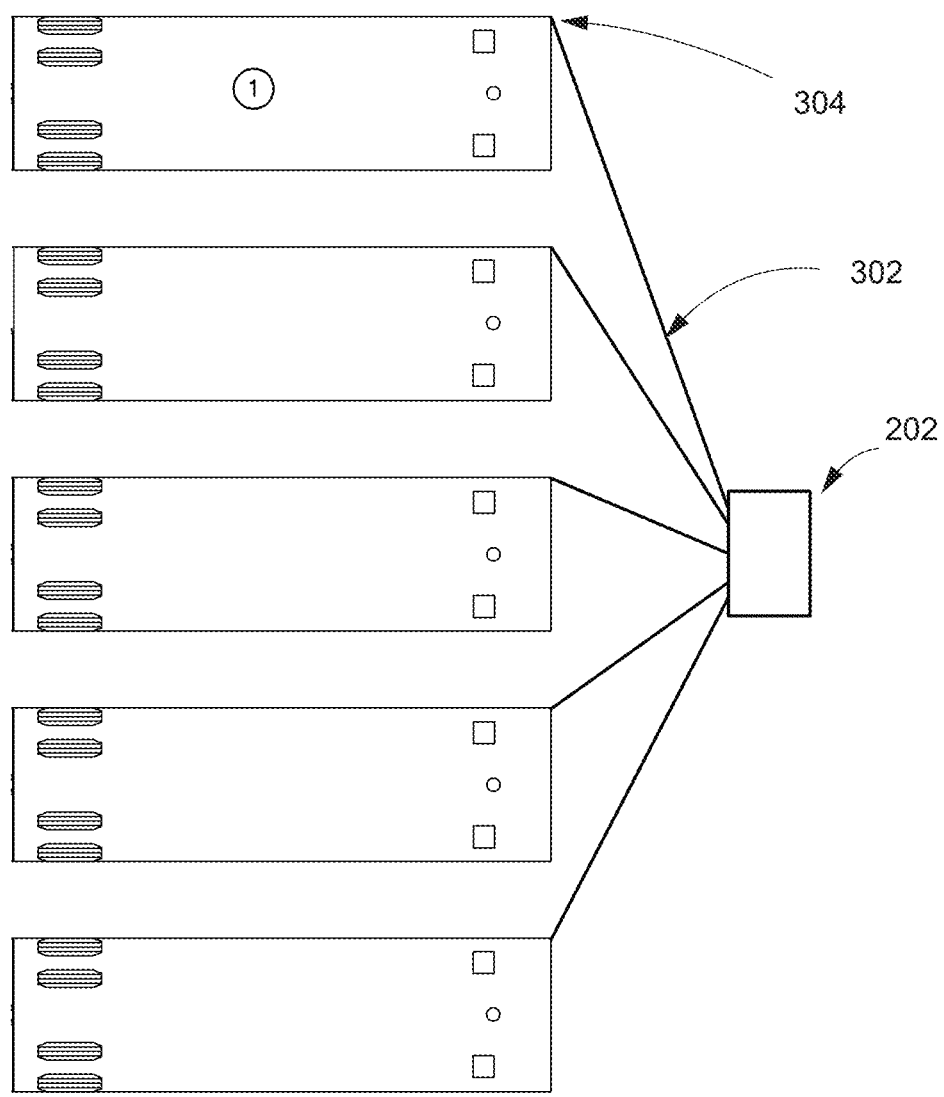
FIG. 6 is an illustration of one or more semi-trailers connected to a fixed generator in accordance with an embodiment of the invention.

FIG. 6 is an illustration of one or more semi-trailers connected to a fixed generator in accordance with an embodiment of the invention. In one embodiment of the invention, five semi-trailers are shown with the heating elements on the roof of each semi-trailer or on the flatbed underdeck. Each semi-trailer is connected to a power supply. In one embodiment, the power supply is a fixed commercial generator 202 with all internal elements added to it. Persons skilled in the art will appreciate that any power supply capable of producing 110-volt power for the system will work. However, a commercial generator can be readily deployed in transportation distribution centers and company terminals and other places where semi-trailer de-icing is needed. Electric wiring 302 is connected to the fixed commercial generator 202 which is strong enough to deice or keep ice from forming on the five semi-trailers.

Figure 7:
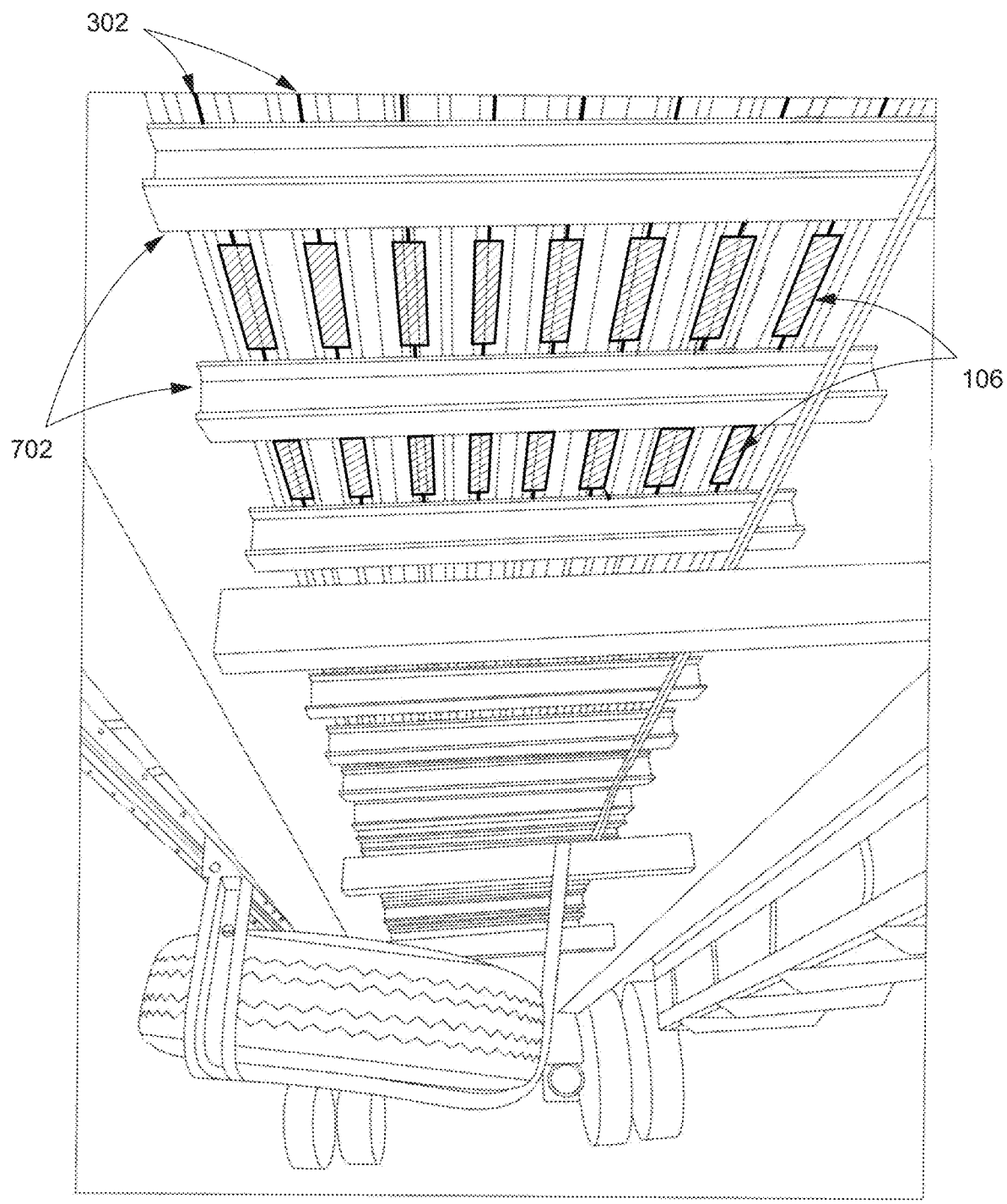
FIG. 7 is an illustration of the underside of a semi-trailer including heating units attached to a surface in accordance with an embodiment of the invention.

FIG. 7 is an illustration of the underside of a semi-trailer including heating units attached to a surface in accordance with an embodiment of the invention. In embodiments of the invention, heating units 106 are attached to the underside of the semi-trailer deck. The cross beams 702 are where the wiring is connected and clipped to in order to heat and entire length of the flatbed trailer. Cross beams 702 support electrical wiring 302 and keep such wiring from falling while the trailer is moving.

Figure 8:
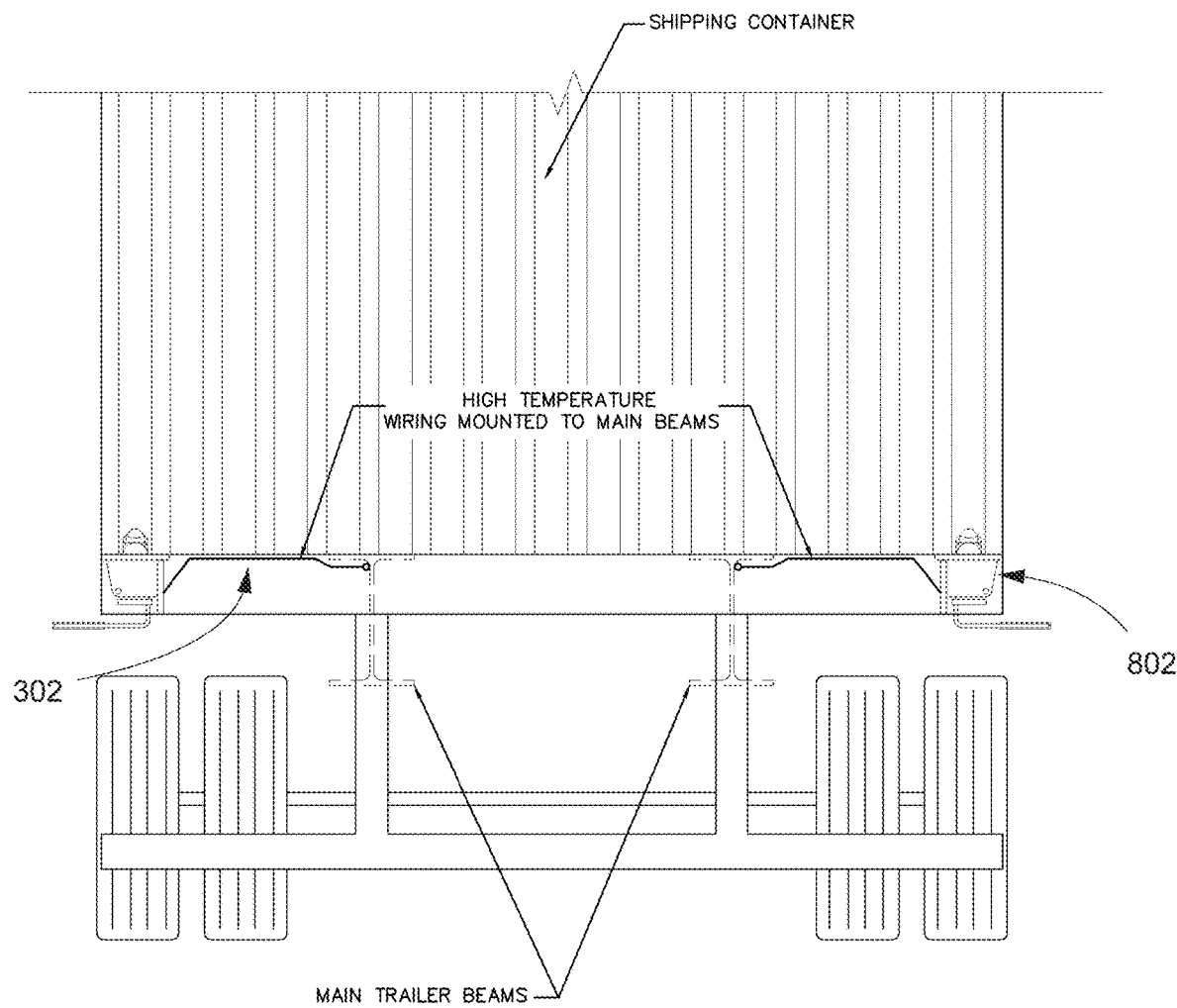
FIG. 8 is an illustration of a container chassis with a shipping container attached in accordance with an embodiment of the invention.

FIG. 8 is an illustration of a container chassis with a shipping container attached in accordance with an embodiment of the invention. In an embodiment of the invention, a shipping container chassis having a plurality of shipping container twist-locks mounted to the deck of the trailer is shown. Each twist-lock device consists of a frame 802 which is mounted to a container chassis. Persons skilled in the art will appreciate that numerous means and methods are available to mount shipping container twist-lock frames to such a container chassis. A shipping container can be secured to the deck of the flatbed semi-trailer using such shipping container twist-locks. In an embodiment of the invention, wiring 302 is mounted on shipping container semi-trailer which leads towards shipping container twist-lock frames 802. Persons skilled in the art will appreciate that numerous mounting systems and methods for wiring can be chosen, such as, but not limited to, adhesives and composite mounting. In embodiments of the invention, the plurality of twist-lock attachments have heating elements mounted to the frame of said twist-lock attachments.

Figure 9:
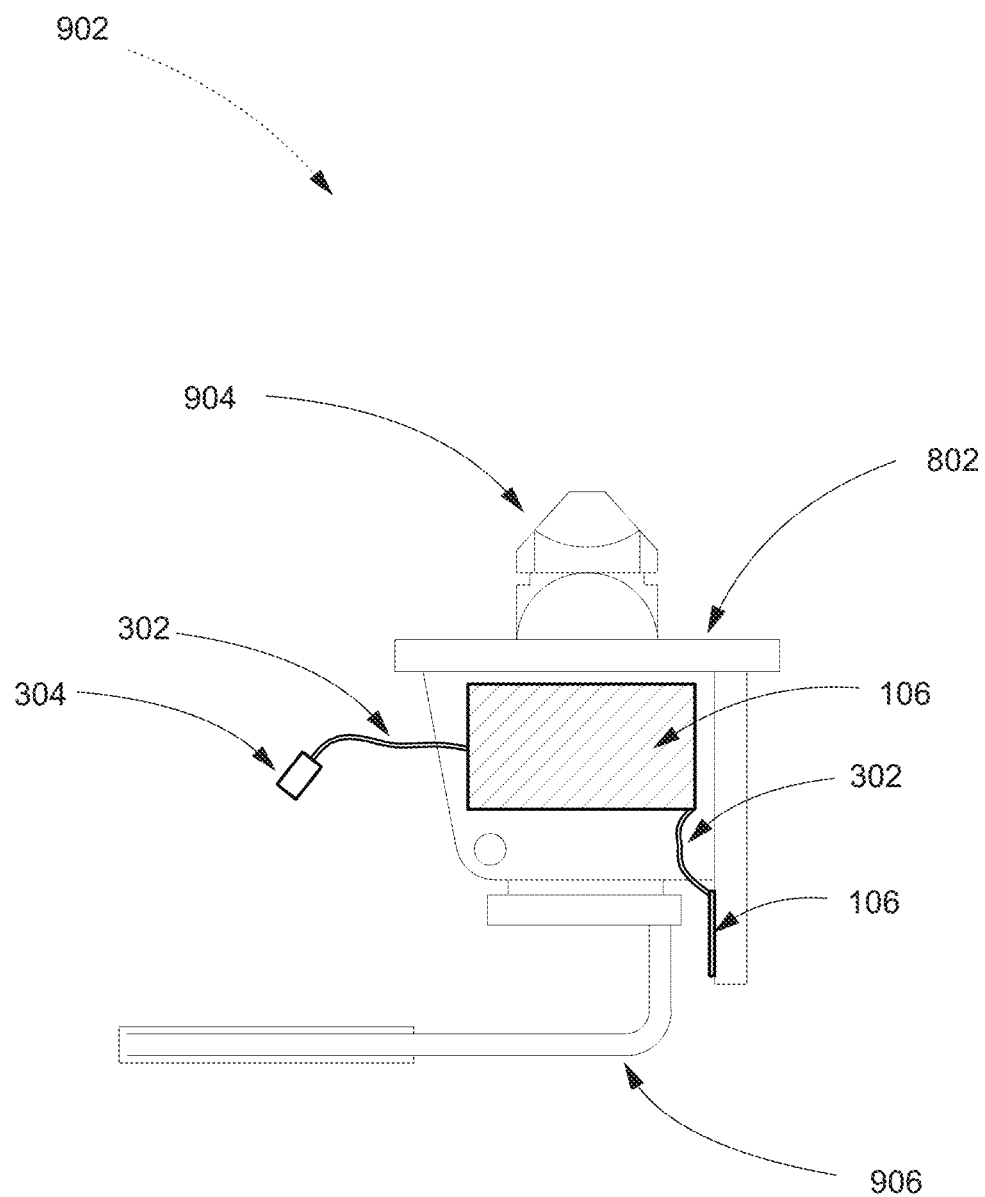
FIG. 9 is an illustration of a twist-lock device with wiring and heating elements attached in accordance with an embodiment of the invention.

FIG. 9 is an illustration of a twist-lock for a container chassis 902, with wiring 302 and heating elements 106 attached in accordance with an embodiment of the invention. In embodiments of the invention, the twist-locks for an intermodal container chassis trailer has a frame 802 having at least one flat surface and can be welded to a shipping container chassis to secure and haul intermodal shipping containers by truck. Such a twist-lock connects to the corner castings or fittings of an intermodal shipping container. In an embodiment of the invention, aviation grade silicone heating elements 106 are mounted on shipping container twist-lock frames 802. An anchor pin 904 is the large point on top of the lock which is inserted into a corner casting or corner fitting of a shipping container. The twist-lock pin secures the container in place when a handle 906 is twisted and engages a standard locking mechanism. The silicone heating units 106 are attached to the outside case of the twist-lock device 802. Cannon plugs 304 connect the heaters. When electrical current is sent to the heating elements 106, heat is created and conducted through the metal, which melts ice, and prevents ice accumulation. The result is easier removal of a shipping container from a container chassis.

Figure 10:
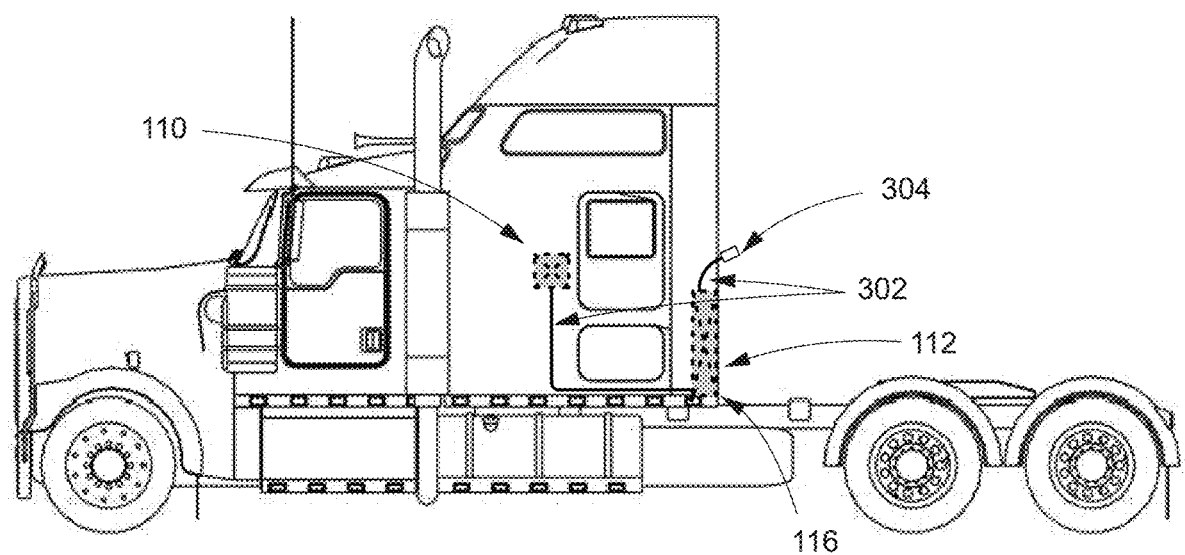
FIG. 10 is an illustration of a driver's side of a semi-trailer truck with sleeper cab showing the mounting of a switch unit, temperature display, and temperature controller in the sleeper cab in accordance with an embodiment of the invention.

FIG. 10 is an illustration of a driver's side of a semi-trailer truck with sleeper cab showing the mounting of a switch unit 110, temperature display 116, and temperature controller 112 in the sleeper cab of a semi-truck in accordance with an embodiment of the invention. In one embodiment of the invention, the components, represented by broken lines, are mounted in the sleeper cab. The temperature controller 112 can be connected to a temperature display 116 to form an integrated unit accessible to a trucker/operator. The components are connected by suitable electrical wiring 302 known and appreciated in the art. A switch unit 110 enables a trucker/operator to provide power to the system.

Figure 11:
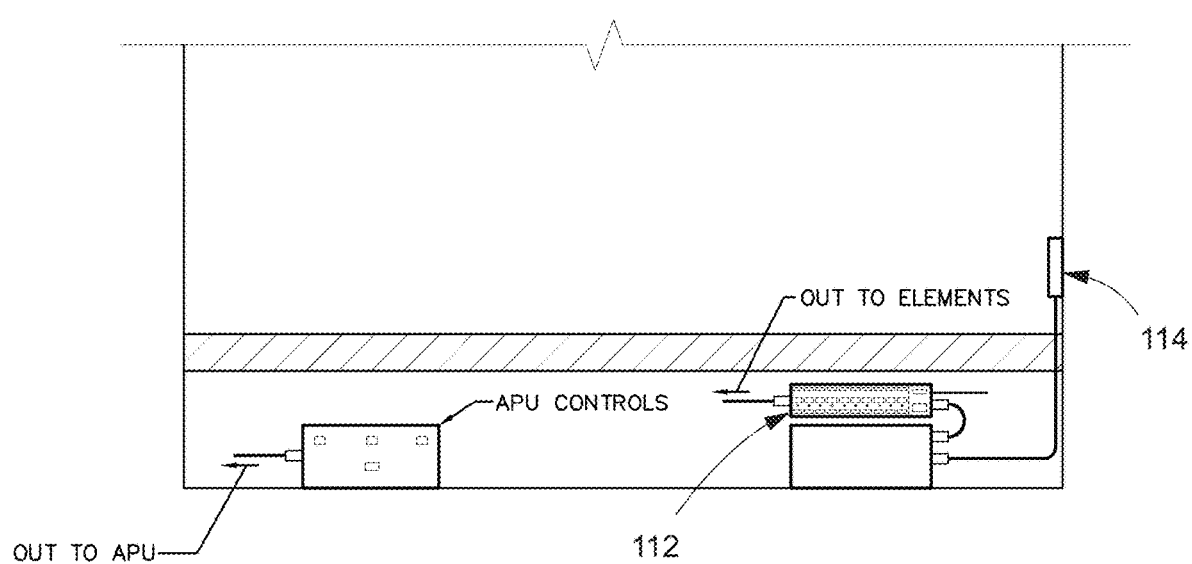
FIG. 11 is an illustration of the interior of a semi-truck showing placement of the system controls in accordance with an embodiment of the invention.

FIG. 11 is an illustration of the interior of a semi-truck showing placement of the de-icing system controls in accordance with an embodiment of the invention. In this illustration, components such as the temperature controller 112 and controls to the auxiliary power unit (APU) are mounted under the bed 1102 of the sleeper cabin. The truck side walls 1104 can serve as mounting points for such components as the contactor or solid-state relay (SSR) 114. Such a configuration allows for a trucker to operate the de-icing system while parked and while the trucker is resting.

Figure 12:
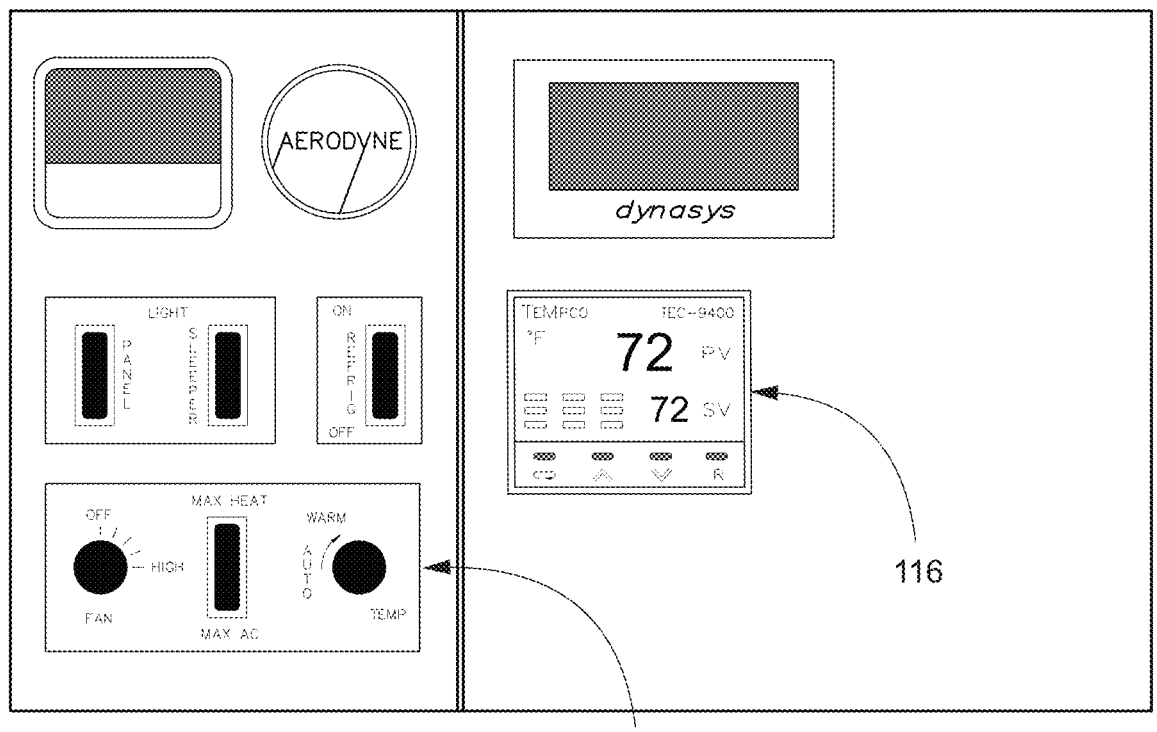
FIG. 12 is an illustration of a climate control unit for an APU and a temperature display unit mounted in the interior of a semi-truck in accordance with an embodiment of the invention.

FIG. 12 is an illustration of a climate control unit for an APU and a temperature display unit mounted in the interior of a semi-truck in accordance with an embodiment of the invention. Embodiments of the invention include a power switch 110 and a display interface 116. In one embodiment of the invention, the climate control unit is mounted under the bed in a sleeper cabin. However, persons having skill in the art will appreciate that such a climate control unit can be mounted in any spare space of the interior of a semi-truck.

Figure 13:
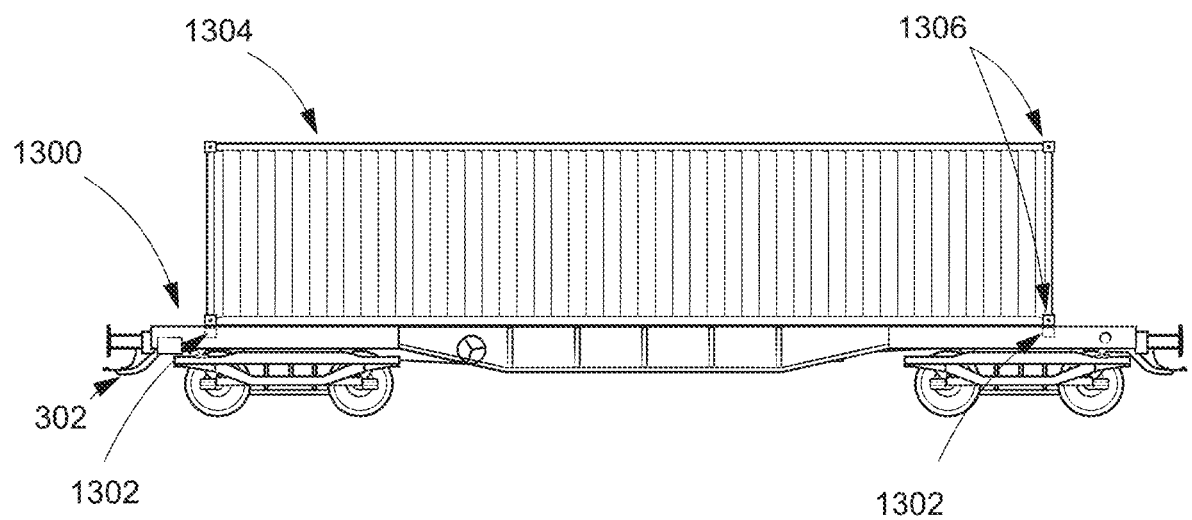
FIG. 13 is an illustration of a conventional intermodal railcar showing the placement of twist-lock devices with heating elements attached.

FIG. 13 is an illustration of a conventional intermodal railcar chassis 1300 showing the placement of twist-lock devices 1302 with heating elements attached. Persons skilled in the art will also appreciate that intermodal well cars, a variation of the conventional intermodal rail car in which shipping containers can be stacked two-high and held in place with the use of twist-locks, can also be configured to have heating elements mounted to the twist-locks 1302 in such rail cars. A conventional shipping container 1304 is mounted to an intermodal railcar 1300 with twist-locks inserted into apertures in the container corner castings or corner fittings 1306. As with other embodiments disclosed, electrical wiring 302 is utilized to connect the heating elements to the temperature controller. Persons having skill in the art will appreciate that freight train electrical power supply systems (EPSS) can be utilized to provide electricity for such a system. Persons having skill in the art will further understand that a temperature control unit can be configured in conjunction with a freight train electrical power supply system so as to govern temperatures of twist-locks on freight cars.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the system for ice removal and the prevention of ice buildup on semi-trailers, and intermodal shipping container chassis systems, other equivalent or alternative methods of implementing the system for ice removal and the prevention of ice buildup on semi-trailers, and intermodal shipping container chassis systems according to the present invention will be apparent to those skilled in the art. Various aspects of the invention have been described above by way of illustration, and the specific embodiments disclosed are not intended to limit the invention to the particular forms disclosed. The particular implementation of the system for ice removal and the prevention of ice buildup on semi-trailers, and intermodal shipping container chassis systems may vary depending upon the particular context or application. By way of example, and not limitation, the system for the removal and prevention of ice accumulation on semi-trailers described in the foregoing was principally directed to semi-trailer variations. However, similar techniques may instead be applied to other transportation and cargo hauling systems which implementations of the present invention are contemplated as within the scope of the present invention. For example, the invention can be readily directed towards intermodal shipping container systems such as, but not limited to, intermodal shipping containers and corner castings, intermodal freight cars and intermodal well cars, shipping container chassis trailers, and deck-mounted shipping container systems used by cargo ships. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Although specific features of the system for ice removal and the prevention of ice buildup on semi-trailers, and intermodal shipping container chassis systems are shown in some drawings and not others, persons skilled in the art will understand that this is for convenience. Each feature may be combined with any or all of the other features in accordance with the invention. The words "including," "comprising," "having," and "with" as used herein are to be interpreted broadly and comprehensively, and are not limited to any physical interconnection. Claim elements and steps herein may have been numbered and/or lettered solely as an aid in readability and understanding. Any such numbering and lettering in itself is not intended to and should not be taken to indicate the ordering of elements and/or steps in the claims to be added at a later date.

Any amendment presented during the prosecution of the application for this patent is not a disclaimer of any claim element presented in the description or claims to be filed. Persons skilled in the art cannot reasonably be expected to draft a claim that would literally encompass each and every equivalent.

What is claimed is:

1. A semi-trailer and intermodal chassis de-icing system, the system comprising:
    a power supply;
    a semi-trailer having at least one surface;
    a plurality of heating elements mounted to, and spaced apart at regular intervals from one another, the at least one surface of the said semi-trailer;
    at least one temperature sensor; and a temperature controller unit; including
        at least one processor and memory having computer executable instructions which, when executed by the at least one processor, cause the system to:
        allow a user to program a desired temperature of the semi-trailer having at least one surface;
        sense a temperature of the semi-trailer; heat the at least one semi-trailer surface with the said plurality of heating elements spaced apart at regular intervals from one another, and
        maintain the said desired temperature of the at least one surface of the semi-trailer;
    wherein the semi-trailer and intermodal chassis de-icing system having at least one surface is a flatbed intermodal trailer having a plurality of twist-locks for container chassis trailers said plurality of twist-locks for container chassis trailers having heating elements mounted to at least one surface of said twist-locks for container chassis trailers.

2. The system of claim 1 wherein the power supply is an auxiliary power unit mounted to a semi-truck.

3. The system of claim 1 wherein the power supply is a commercial generator.

4. The system of claim 1 wherein the power supply is a standard 110-volt power outlet.

5. The system of claim 1 wherein the heating elements have a thickness of less than 2 millimeters.

6. The system of claim 1 wherein the plurality of heating elements are a wire-wound style.

7. The system of claim 1 wherein the plurality of heating elements are an etched foil style.

8. The system of claim 1 wherein the at least one surface of the semi-trailer having at least one surface is a roof of a semi-trailer.

9. The system of claim 1 wherein the at least one surface of the semi-trailer having at least one surface is the underside of a semi-trailer.

* * * * *